United States Patent
Mihailescu et al.

(10) Patent No.: US 8,153,986 B2
(45) Date of Patent: Apr. 10, 2012

(54) HYBRID COMPTON CAMERA/CODED APERTURE IMAGING SYSTEM

(75) Inventors: Lucian Mihailescu, Livermore, CA (US); Kai M. Vetter, Alameda, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 696 days.

(21) Appl. No.: 12/170,323

(22) Filed: Jul. 9, 2008

(65) Prior Publication Data
US 2009/0122958 A1    May 14, 2009

Related U.S. Application Data

(60) Provisional application No. 60/958,967, filed on Jul. 9, 2007.

(51) Int. Cl.
    *H01L 27/146*    (2006.01)
    *G01T 1/00*    (2006.01)
(52) U.S. Cl. ........... 250/370.1; 250/363.06; 250/370.11; 250/370.13
(58) Field of Classification Search ........... 250/336.1, 250/370.1, 370.09, 370.11, 370.13, 363.06; 378/87
    See application file for complete search history.

(56) References Cited

U.S. PATENT DOCUMENTS

| | | | | |
|---|---|---|---|---|
| 6,528,795 B2* | 3/2003 | Kurfess et al. | ............. | 250/370.1 |
| 7,541,592 B2* | 6/2009 | Gottesman | ............... | 250/370.06 |
| 2007/0284532 A1* | 12/2007 | Nakanishi et al. | ........ | 250/339.02 |
| 2007/0290284 A1* | 12/2007 | Shaffer | ........................ | 257/432 |
| 2008/0203316 A1* | 8/2008 | Ziock | ............................ | 250/393 |
| 2009/0114824 A1* | 5/2009 | Zelakiewicz et al. | ..... | 250/363.02 |
| 2010/0177869 A1* | 7/2010 | Laurent et al. | .................. | 378/62 |

OTHER PUBLICATIONS

Mihailescu et al., "Combined Measurements With Three-Dimensional Design Information Verification System and Gamma Ray Imaging-A Collaborative Effort Between Oak Ridge National Laboratory, Lawrence Livermore National Laboratory, and The Joint Research Center At ISPRA" 47th INMM Annual Meeting, Nashville, TN., Jul. 16-20, 2006.

"Imagers Provide Eyes to See Gamma Rays" Lawrence Livermore National Laboratory, S&TR May 2006.

* cited by examiner

*Primary Examiner* — David Porta
*Assistant Examiner* — Jessica L Eley
(74) *Attorney, Agent, or Firm* — Eddie E. Scott

(57) ABSTRACT

A system in one embodiment includes an array of radiation detectors; and an array of imagers positioned behind the array of detectors relative to an expected trajectory of incoming radiation. A method in another embodiment includes detecting incoming radiation with an array of radiation detectors; detecting the incoming radiation with an array of imagers positioned behind the array of detectors relative to a trajectory of the incoming radiation; and performing at least one of Compton imaging using at least the imagers and coded aperture imaging using at least the imagers. A method in yet another embodiment includes detecting incoming radiation with an array of imagers positioned behind an array of detectors relative to a trajectory of the incoming radiation; and performing Compton imaging using at least the imagers.

33 Claims, 8 Drawing Sheets

HYBRID COMPTON CAMERA/CODED APERTURE IMAGING SYSTEM

RELATED APPLICATIONS

This application claims priority to provisional U.S. application Ser. No. 60/958,967 filed on Jul. 9, 2007, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to imaging systems, and more particularly to hybrid imaging systems.

BACKGROUND

Radioactive materials are often detected and identified by measuring gamma-rays emitted from the materials. The energy of gamma-rays is specific to that particular material and acts as a "finger print" to identify the material. A high resolution detector typically has better sensitivity and identification capability.

The ability to detect gamma rays is a vital tool for many areas of research. Gamma-ray detectors allow scientists to study celestial phenomena and diagnose medical diseases, and they have been used to determine the yield in an underground nuclear test. Today, these detectors are an important tool for homeland security, helping the nation confront new security challenges. Government agencies need detectors for the scenarios in which a terrorist might use radioactive materials to fashion a destructive device targeted against civilians, structures, or national events. To better detect and prevent terrorist attacks, the Department of Homeland Security (DHS) is funding projects to develop a suite of detection systems that can search for illicit radioactive sources in different environments.

Livermore researchers have been applying their expertise in radiation detection for more than 30 years. For example, detectors have been designed for use in treaty inspections can monitor the location of nuclear missile warheads in a nonintrusive manner. These detectors measure the gamma rays emitted from the isotopes of nuclear elements contained in weapons. Over the years, Laboratory researchers have developed a range of radiation detection instruments, including detectors on buoys for customs agents at U.S. maritime ports, cargo interrogation systems, and high-resolution handheld instruments that emergency response personnel could use to search for a clandestine nuclear device.

Gamma rays have the highest energy in the electromagnetic spectrum. They tend to go straight through matter, rather than reflect or bend as visible light does. Mirrors or lenses cannot be used to depict, or image, gamma rays, but their energy can be measured indirectly by observing how photons interact with a detector material. For many applications, however, researchers need to accurately determine where gamma rays originate, and doing so requires imaging technology. For example, many radiation detectors have excellent energy resolution and sensitivity to sources within a range of several meters. At greater distances, however, the source can be lost in a clutter of background gamma-ray emission from the environment, including concrete, natural mineral deposits, and some foods.

Detector developers want to design instruments that quickly survey large areas at a distance and accurately distinguish illicit from background signals. However, when a detector covers a large area, the signal from an object in the background can mimic the signature from a source of interest, even though the sources are widely separated. For example, a concrete building 20 meters from the detector may register the same as an illicit source located farther away. This similarity makes the detection of weak signals impossible unless the characteristics of the background are known in advance—unlikely in searches for clandestine radioactive materials.

Most state of the art gamma-ray imagers are collimator-based systems. They normally contain a collimating part that is made of a heavy, high Z material, such as lead or tungsten, and a position sensitive radiation detector. The imaging functionality relies on the fact that the collimator blocks the gamma-rays falling on it, casting a shadow on the detector surface. An image reconstruction algorithm analyzes the shadow, reconstructing the spatial distribution of tile radiation source. These gamma-ray imagers work well with low energy gamma-rays, but for gamma-rays of increasing energies, the collimators lose their absorbing efficiency, leading to low contrast, low sensitivity imaging.

Applications of gamma ray imaging such as those used in search and surveillance scenarios, as well as in applications which require mapping of radioactive sources distributed within a large field-of-view in the medium to large-field distances, require a different solution than the ones offered by standard tomographic methods.

There is thus a need for addressing these and/or other issues associated with the prior art.

SUMMARY

A system in one embodiment comprises an array of radiation detectors; and an array of imagers positioned behind the array of detectors relative to an expected trajectory of incoming radiation.

A method in another embodiment comprises detecting incoming radiation with an array of radiation detectors; detecting the incoming radiation with an array of imagers positioned behind the array of detectors relative to a trajectory of the incoming radiation; and performing at least one of Compton imaging using at least the imagers and coded aperture imaging using at least the imagers.

A method in yet another embodiment comprises detecting incoming radiation with an array of imagers positioned behind an array of detectors relative to a trajectory of the incoming radiation; and performing Compton imaging using at least the imagers.

Other aspects and embodiments of the present invention will become apparent from the following detailed description, which, when taken in conjunction with the drawings, illustrate by way of example the principles of the invention.

DETAILED DESCRIPTION

Figure 1A:
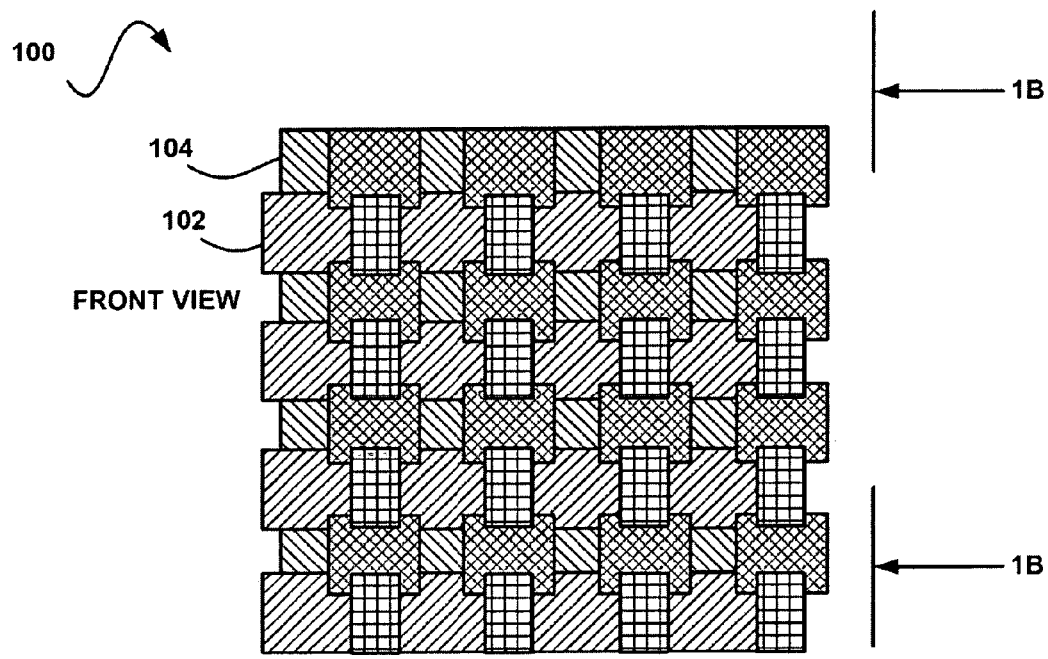
FIG. 1A is a front view of a system for gamma ray imaging according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

A system in one general embodiment includes an array of radiation detectors, and an array of imagers positioned behind the array of detectors relative to an expected trajectory of incoming radiation. Note that for any embodiment, and as discussed in more detail below, the detectors and imagers may have the same construction and functionality, or different construction and/or functionality, depending on the intended use of the system.

A method in one general embodiment includes detecting incoming radiation with an array of radiation detectors, detecting the incoming radiation with an array of imagers positioned behind the array of detectors relative to a trajectory of the incoming radiation, and performing at least one of Compton imaging using at least the imagers and coded aperture imaging using at least the imagers.

In another general embodiment, the imagers can be used by themselves for Compton imaging, e.g., by using scatterings across the imagers. Accordingly, a method according to the general embodiment comprises detecting the incoming radiation with an array of imagers positioned behind an array of detectors relative to a trajectory of the incoming radiation; and performing Compton imaging using at least the imagers.

Note also that the operational role of the imagers and detectors can be reversed for gamma-rays coming from another direction. In other words, a given device may provide bidirectional, and even multi-directional detection and tracking capabilities.

The following description presents a new radiation imaging concept that combines coded aperture principles with Compton imaging principles. This hybrid functionality results in systems that are sensitive to radiation such as gamma-rays in a very broad range of energies, such as from about 25 kiloelectronvolts (keV) to several megaelectronvolts (MeV). Some embodiments do not use collimators in the classic sense, but rather use active detectors that act as collimators and imagers (which themselves may be detectors), at the same time. This approach makes use of collimation-based imaging for gamma-rays of low-energies, where this imaging functionality is most efficient. For higher energy photons, imaging is done by Compton scatter imaging. The detectors and imagers may be mounted on a frame or frames in two or more layers. Each layer of detectors or imagers forms a pattern that helps imaging by using the coded aperture functionality, without compromising Compton imaging functionality.

While much of the description described herein will be described in terms of gamma ray imaging, this has been done by way of example only and to provide one possible context for the teachings herein. It will be appreciated by those skilled in the art that the teachings herein may be extended to other types of radiation.

Figure 1B:
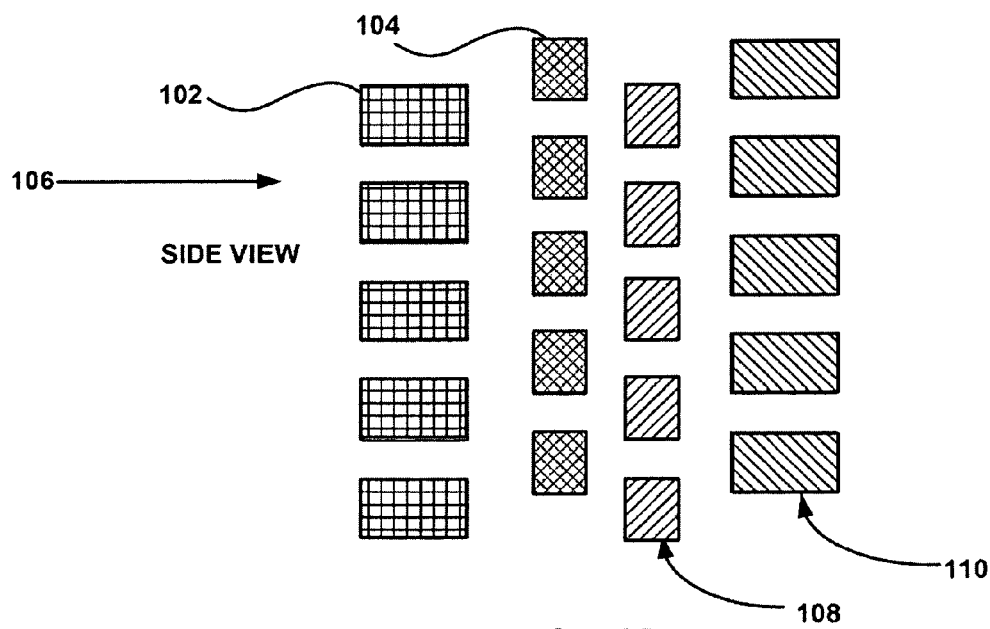
FIG. 1B is a side view of the system of FIG. 1A taken along line 1B-1B of FIG. 1A.

FIGS. 1A and 1B depict a system 100 having an array of radiation detectors 102 and an array of imagers 104 positioned behind the array of detectors relative to an expected trajectory 106 of incoming radiation such as gamma rays. Such a radiation (e.g., gamma-ray) imaging system 100 may combine the high efficiency of coded apertures, defined between the detectors 102, for low energy photons with the high efficiency and large field of view of Compton imagers for photons of higher energies in a hybrid imaging system.

Note that, as will soon become apparent, the imagers 104 may be detectors themselves, and may have the same, similar or different construction and/or functionality as the detectors 102 in the first array. Accordingly, the term "detectors" as used herein may apply to both the aforementioned imagers 104 as well as the aforementioned detectors 102.

FIGS. 1A and 1B also illustrate that more than two arrays of detectors/imagers may be present. To that end, third and fourth arrays 108, 110 of detectors are shown. Note that any number of arrays may be used, such as 3, 4, 5, 6, 7, 8, 10, 12, etc.

In some embodiments, the designation or function as detectors and imagers may be interchangeable. For example, the direction of the incident gamma-ray may determine how the detectors are used, e.g. as collimators or imagers. Moreover, where more than two arrays are present, as in FIG. 1A, some imagers may function as both imagers and collimators for radiation traversing more than two arrays.

In one approach, modular detectors are used. These detectors can then be supported by one or more frames, preferably of a material that does not interfere with the incoming gamma rays and/or their detection. For portable units, the frames are preferably lightweight, e.g., of plastic.

For improved performance, some or all of the detectors and/or imagers can be position sensitive. For example, pixilated CdZnTe (CZT) or scintillating detectors can be used. Moreover, the detectors and/or imagers can be semiconductor detectors. The detectors may be arranged in two or more layers.

A hybrid coded-aperture-Compton-scatter imaging system can use room-temperature position sensitive CZT detectors. The use of CZT detectors allows for a relatively easy arrangement of the individual detectors on a variety of patterns. Since no cooling of detectors is required, the CZT detectors can be easily mounted on a light weight plastic frame that defines the pattern.

Alternatively, scintillating detectors can be used. Due to their good energy resolution, LaBr3(Ce) scintillators may be a good choice. Taking advantage of their small size, avalanche photodiodes (APD) can be used to read-out such scintillators.

In one particularly preferred embodiment, the system uses small (about $15 \times 15 \times 5$ mm$^3$), pixilated CZT detectors. It should be noted that larger or smaller detectors may be used, e.g., [1 to 100 mm]×[1 to 100 mm]×[0.5 to 50 mm].

Figure 2:
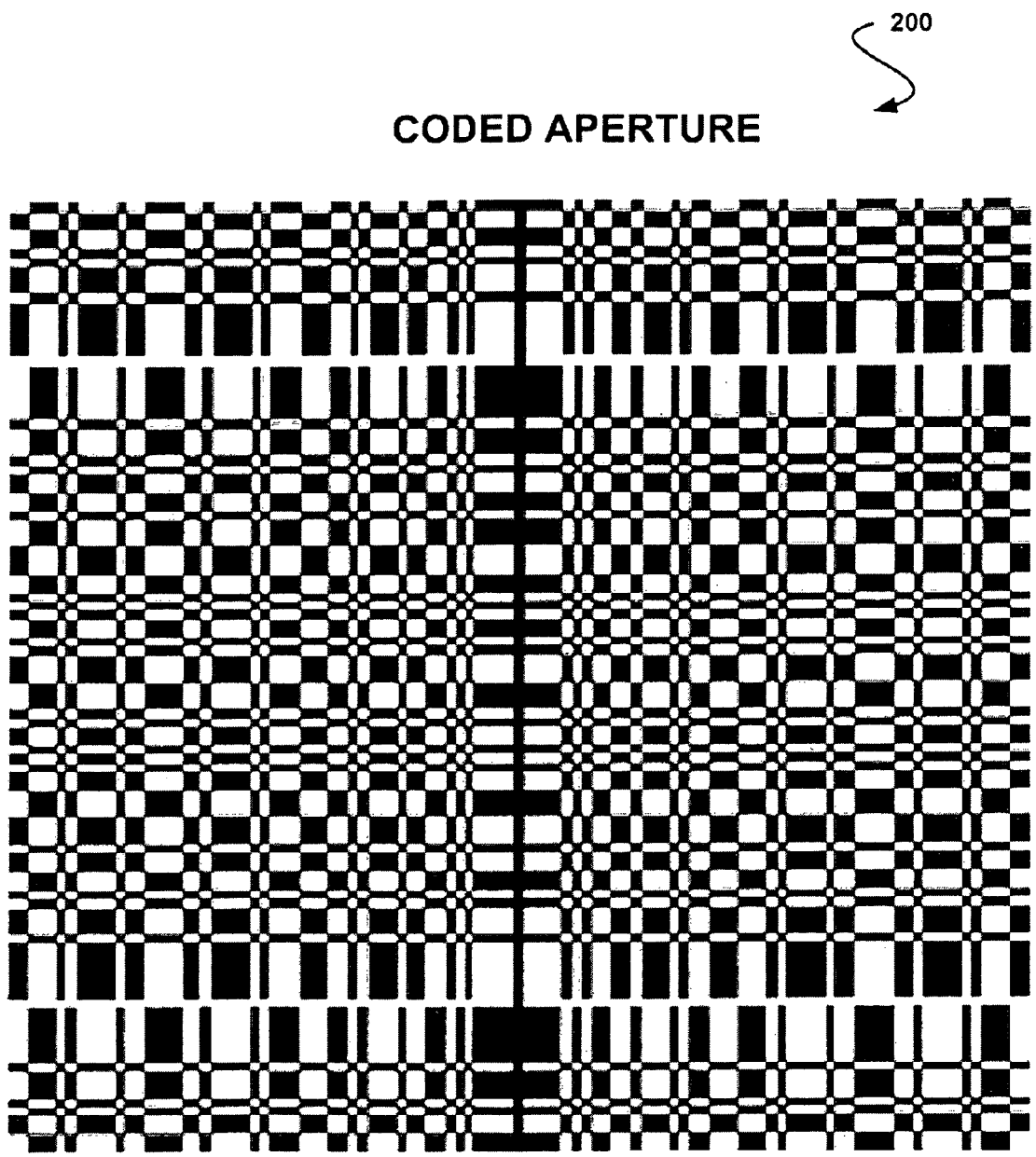
FIG. 2 is a front representational view of one illustrative coded aperture pattern that may be implemented in an imaging system according to one embodiment.
Figure 3:
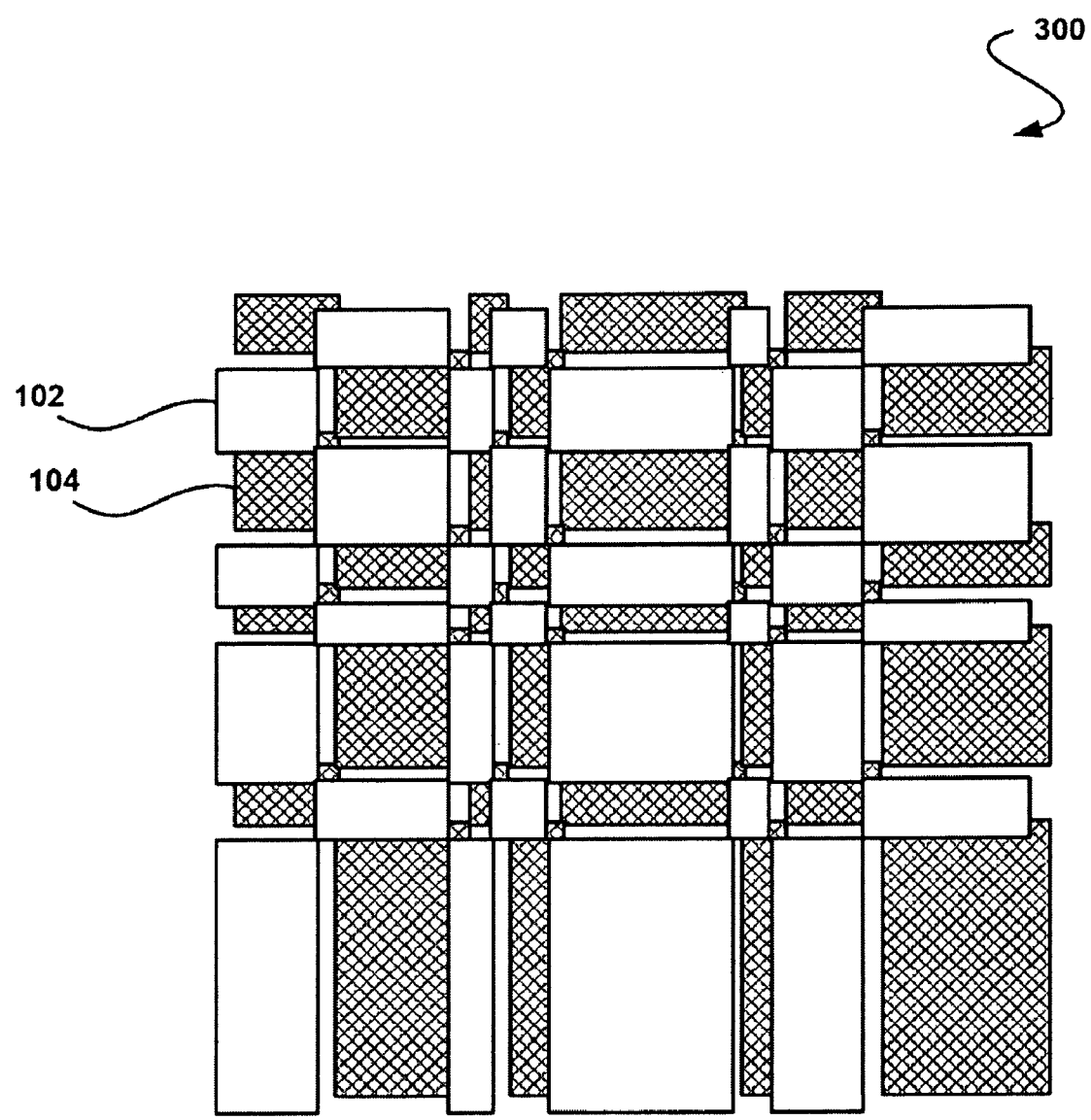
FIG. 3 is a front representational view of another illustrative pattern, showing detectors and imagers in a mask/antimask configuration, that may be implemented in an imaging system according to one embodiment.

The arrangement of the individual detectors within a layer will make a pattern similar to the patterns used in coded aperture masks. FIG. 2 illustrates one illustrative coded aperture pattern 200 that may be implemented in a system of detectors in one approach. FIG. 3 illustrates another illustrative pattern 300, showing detectors 102 and imagers 104 in a mask/antimask configuration. Patterns similar to Fresnel zone plates can also be used.

The layering structure provides two types of functionality. First, with reference to FIG. 4, the system 100 may perform coded aperture imaging by selecting single interaction events that have an energy below a certain threshold. One or more layers of detectors 102 acts as an active mask for other layer(s) of detectors 104 behind it. The shadows cast by one layer onto the other provide image coding, especially for lower energy gamma-rays for which the cross section for photoelectric absorption is higher than for Compton scattering.

The coded aperture functionality may be primarily used for photons that produce only one interaction in the detection system. This selection of events will predominantly pick up low energy photons that are absorbed in a photoelectric interaction. This selection applies mainly to events with deposited energies that are in the low range of energies (below 200-300 keV). Image coding is obtained by the attenuation of the gamma-ray intensity flux in the detector elements that are interposed between the interaction point and the image space. The backprojection of the detected gamma-ray photons onto the image space may account for the before mentioned attenuation. Image reconstruction algorithms may be used to correct for the point spread function in each element of the image space. Finally, a distribution of the gamma-ray source may be obtained. The image reconstruction algorithms can be iterative and/or analytic.

In one illustrative approach, as the detector picks up gamma-ray signals, the photon passing through the masking array casts shadows on the detector elements, which the imager array records. The detector elements also measure the signal count and position. As the instrument travels through an area, it accumulates several shadow patterns, or "shadowgrams," and creates a pixel map of the radiation field of the surveyed region.

Each pixel represents an area in the field of view. The pixels are small enough that, when combined, they generate a detailed image of a source of interest. With one map of pixels, distances out to 100 meters or more can be covered.

The image generated from a coded-aperture process may be derived from the variation in gamma-ray signal counts versus signal position on a detector. In an ideal situation, only the shadow cast by the masking array would cause these variations. However, one shortfall of coded-aperture imagers is that gamma-ray sources outside an instrument's field of view can contribute to the signal count. This incident radiation may create shadows that cause the image to blur.

Figure 5:
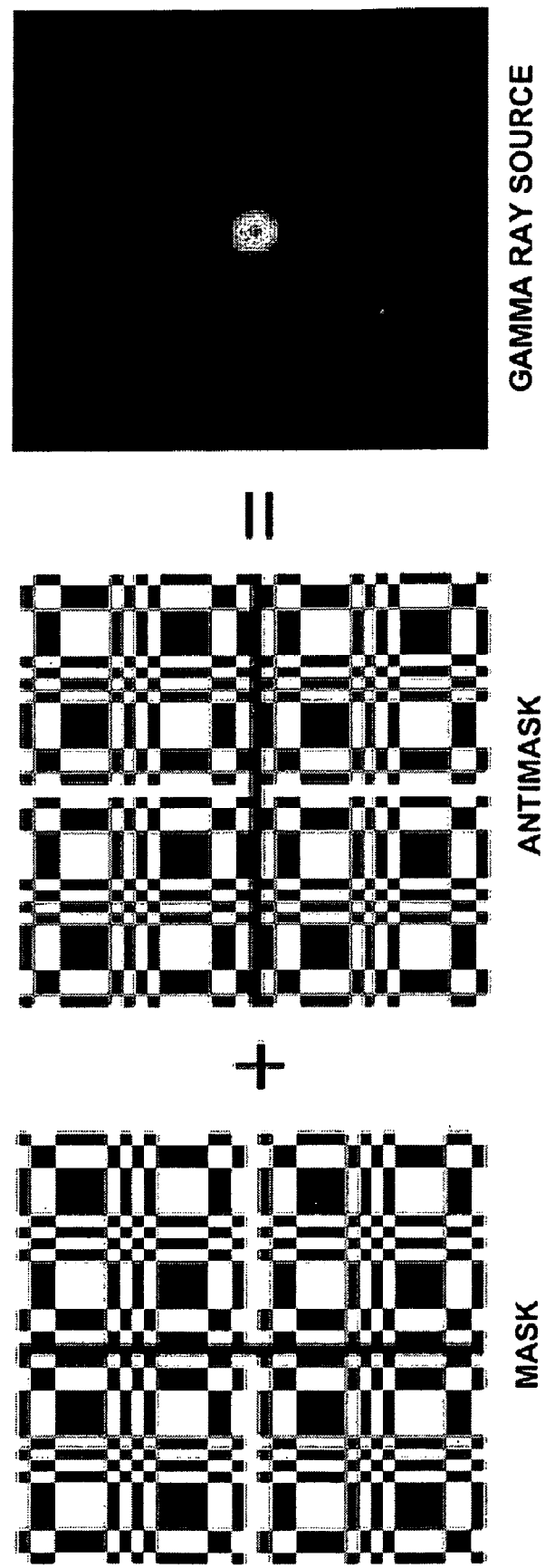
FIG. 5 is a representational view depicting how combining a mask with an antimask whose hole pattern is the inverse of the mask's pattern effectively removes background signals outside the surveyed area.

To compensate for the incident radiation, an antimask array whose hole pattern is the inverse of the pattern on the masking layer may be used. The mask and the antimask are exposed to the source at the same time. Background signals outside the field of view are considered extraneous signals. By subtracting the measurement taken with one mask from the inverse measurement taken with the antimask, only those signals that passed twice through the masks—once through the mask and once through the antimask—remain. FIG. 5 illustrates how combining a mask with an antimask whose hole pattern is the inverse of the mask's pattern effectively removes background signals outside the surveyed area.

Figure 4:
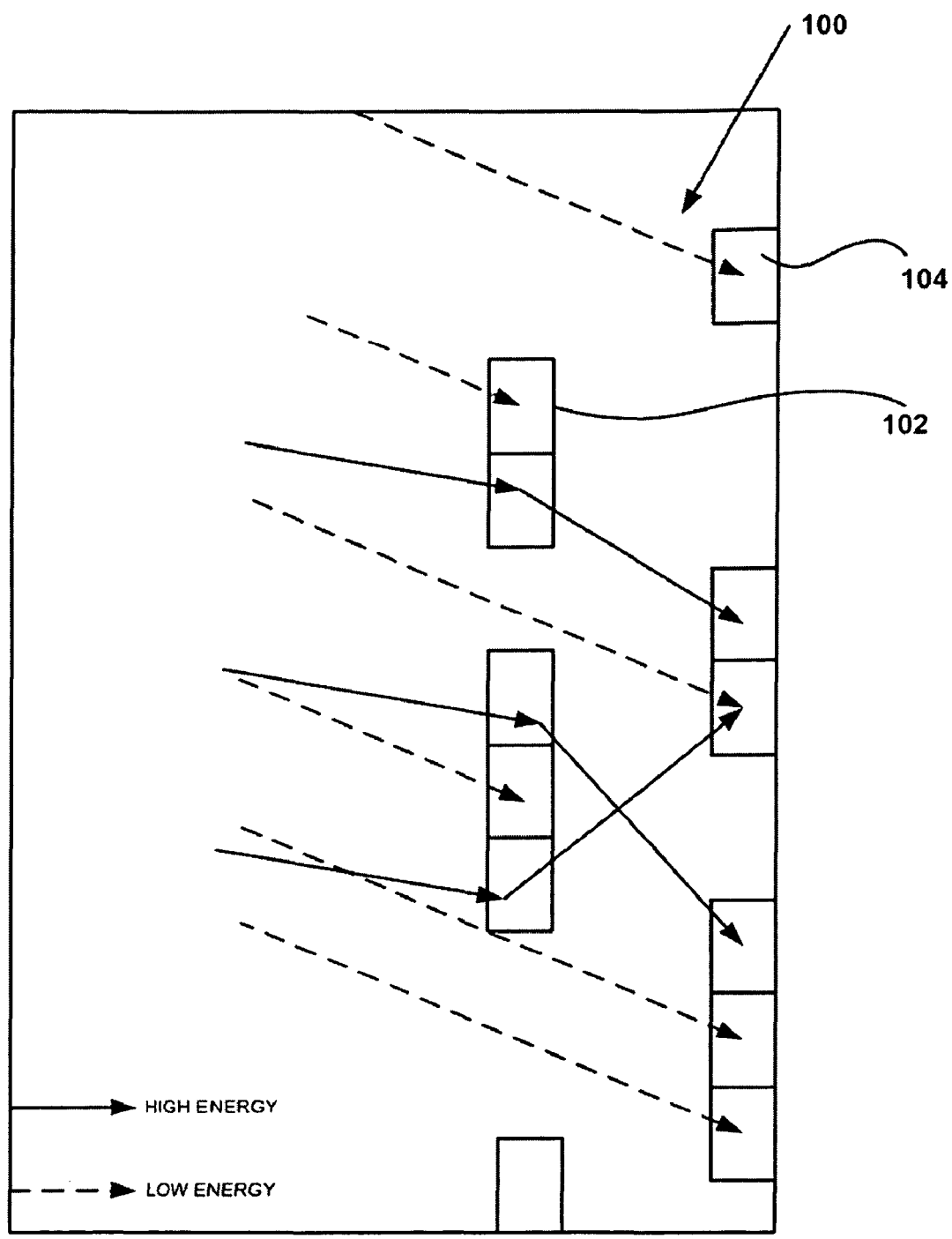
FIG. 4 is a representational view depicting how gamma rays travel through an imaging system according to one embodiment.

Second, with continued reference to FIG. 4, the system 100 may function as a Compton imager by selecting photons with multiple scatterings within or across layers. This functionality is especially important for high energy gamma-rays for which the cross section for Compton scattering is dominant.

Compton imaging is based on the observation that the wavelength of high-energy photons, such as x or gamma rays, increases when the photons interact with electrons in a material. This phenomenon is known as the Compton effect. According to quantum theory, a photon can transfer part of its energy to a loosely bound electron when the two collide. Because x- and gamma-ray photons have high energy, such collisions may transfer so much energy to an electron that it is ejected from its atom. The scattering of photons as they pass through and interact with a material is called Compton scattering.

Compton scattering is the principal absorption mechanism for gamma rays between 100 and 3,000 kiloelectronvolts. Uranium and plutonium both naturally emit radiation within this energy range. Below this range, photoelectric absorption is the dominant interaction type.

The detectors used for Compton imaging according to various embodiments can be designed using various detector materials in different configurations. The key to optimizing imaging efficiency is to induce multiple interactions between the gamma ray and the detector material so the system can detect the full energy of the incident gamma ray. The gamma-ray interactions should be separated in space sufficiently so that they can be easily distinguished from each other and their positions can be accurately measured to obtain high angular resolution.

One requirement for Compton imaging is that a gamma ray must interact with electrons at least twice—once to induce Compton scattering and once to allow photoelectric absorption or another Compton scattering—although more than one scatter can occur. For example, a 1-megaelectronvolt gamma ray averages three Compton scattering interactions before it is finally photoelectrically absorbed by germanium. When an x- or gamma-ray photon is scattered or absorbed, high-energy electrons are ejected. The subsequent deposition of electron energy produces a large number of ionized atoms. The ionization from Compton scattering or photoelectric absorption is then recorded by the detectors.

Note that Compton imaging can be performed even if not all the energy of the photon is deposited in the detector. Sometimes, the user can assume the incident energy of the photon known (especially if a radioactive tracer with known gamma-ray lines is used), or it can be derived from other previously-available information.

In one particularly preferred approach, detectors of superior energy and position resolution and granularity are used for the Compton imaging functionality. Such detectors should be able to provide the positions and energies of individual gamma ray interactions taking place in the detection system. As noted above, this imaging approach requires an incident gamma ray to interact at least twice in the detector: one Compton scattering and one other interaction, which can be either another Compton scattering or photoelectric absorption. Using the Compton scattering formula (Equation 1) for the first Compton scattering interaction taking place in the detector, the necessary imaging information is obtained.

$$\cos\theta = 1 + \frac{511}{E_\gamma} - \frac{511}{E'_\gamma}; \quad E'_\gamma = E_\gamma - E_1 \qquad \text{Equation 1}$$

Figure 6A:
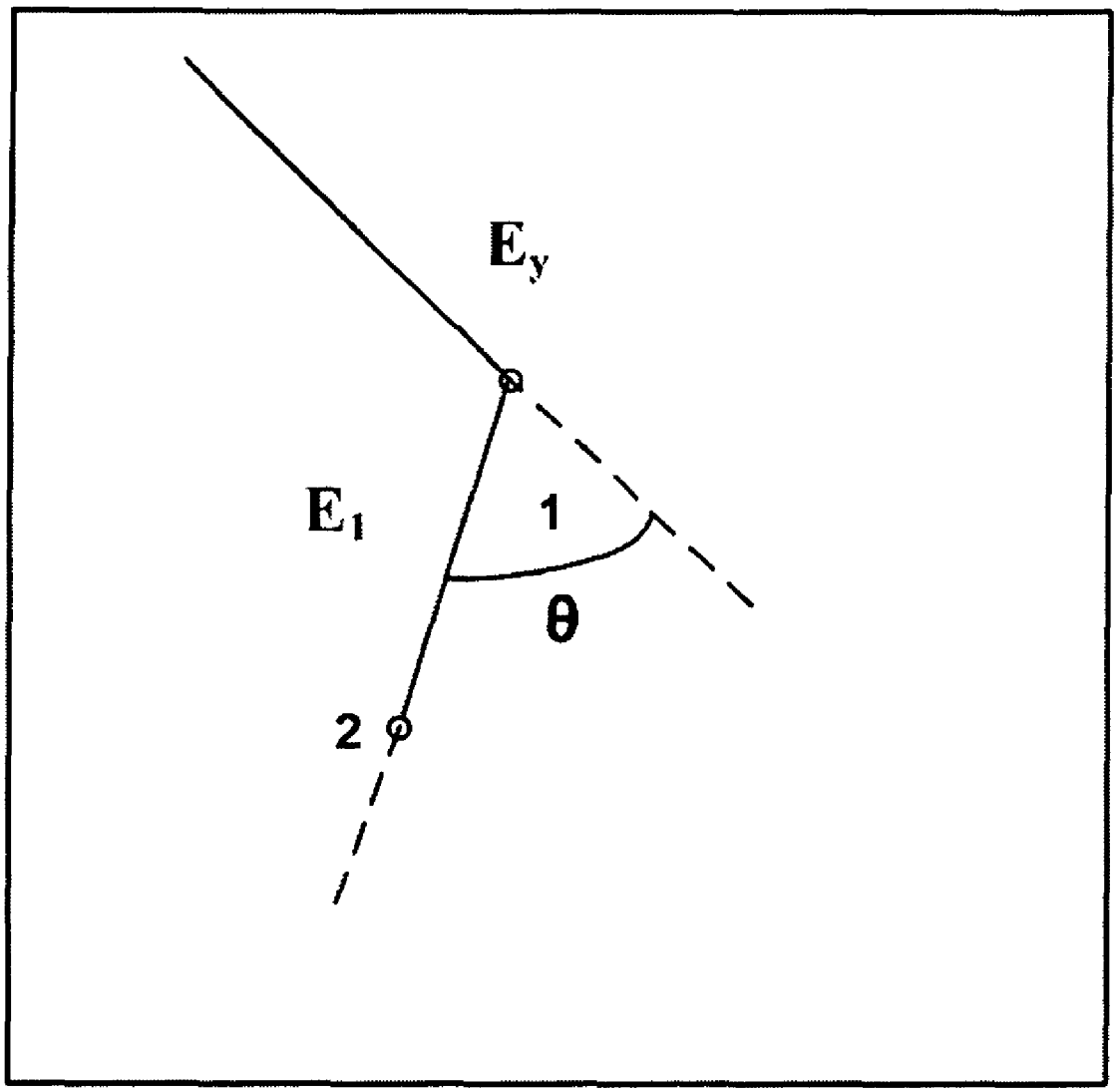
FIG. 6A is a chart depicting gamma ray events, angles and energy used to calculate a Compton cone.
Figure 6B:
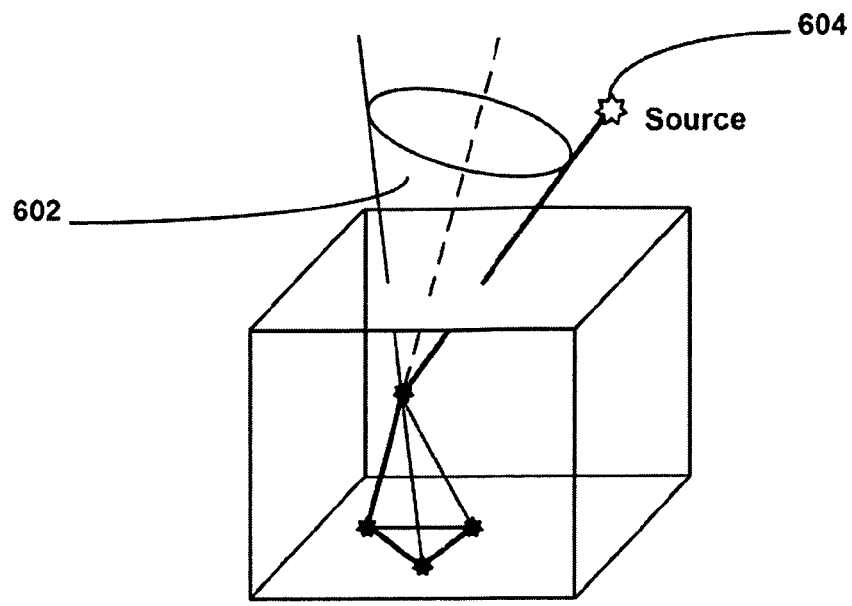
FIG. 6B is a representational view depicting how incoming gamma rays interact with a detector through Compton scattering, and particularly how the energies and positions of the first two interactions define a cone of incident angles.
Figure 6C:
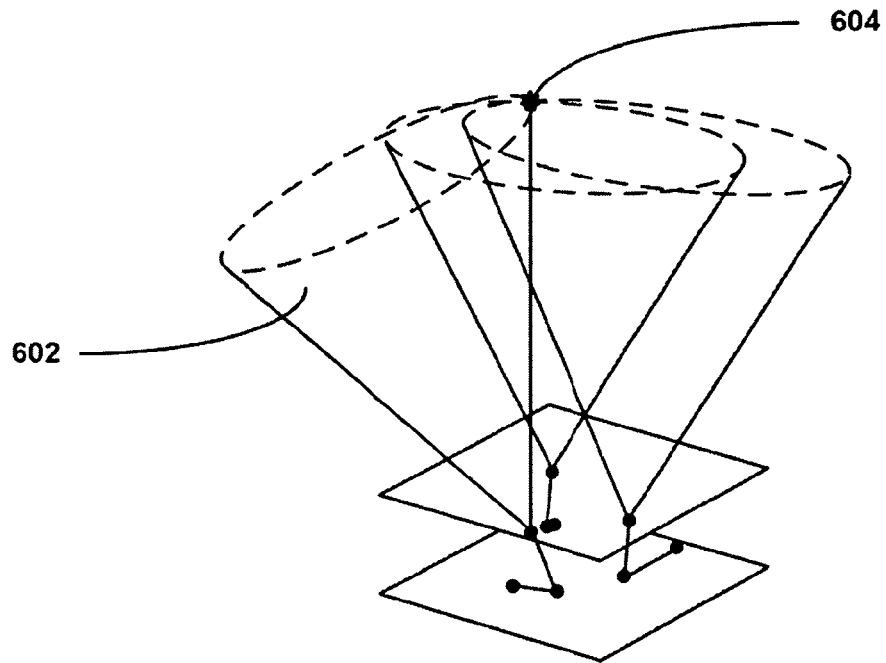
FIG. 6C is a representational view depicting how Compton cones for all imaged events are backprojected onto the assumed image space, e.g., plane or sphere to produce a two-dimensional image of the source.

Referring to FIG. 6A and Equation 1, the Compton scattering formula connects the scattering angle θ, the energy of the incident gamma ray $E_\gamma$, and the energy of the first interaction $E_1$ (both energies are in keV units). Referring to FIG. 6B, the scattering angle θ around the scattering direction determines a cone 602 on the surface of which the gamma-ray source 604 can be found. This is known as a "Compton cone". Referring to FIG. 6C, the Compton cones for all imaged events are then backprojected onto the assumed image space, e.g., plane or sphere (one circle per gamma-ray event) to produce a two-dimensional image of the source.

The image space can also be a cube, or any other representation, to produce a three-dimensional image of the source. This can be done, especially if the imaging system acquires data from different positions, so that parallax information becomes available, hence, depth of source can be deduced.

The backprojection may also account for the attenuation produced by the detection material found between the image space and the vertex of the cone. This attenuation may provide supplementary image coding, which is similar to the coded aperture coding. The coded aperture coding can be taken into account for estimating the backprojected point spread function.

Image reconstruction algorithms may be used to deconvolve for the characteristic Compton imaging point spread function. The image reconstruction algorithms can be iterative and/or analytic.

In any of the approaches set forth above, for coded aperture imaging and/or Compton imaging, the system may include a processor, e.g., microprocessor, CPU running software, ASIC, etc. that merges image information based on the detected gamma rays with visual images. In one approach, the imaging system includes a camera to capture an environment of the source of the gamma rays. Such camera may include or be part of a Red-Green-Blue (RGB) camera, a laser radar imager, infrared camera, etc. The processor then generates a composite image depicting a representation of the source of the gamma rays and a representation of an environment of the source of the gamma rays.

Also, threat indication and/or diagnostics may also be performed based on the detection and/or imaging. For example, characterization or typing of the gamma rays or source thereof may be performed, e.g., using image-spectral analysis, etc. Moreover, trajectories and/or intensities of gamma rays may be determined. Also, coordinates of the approximate location of the source of the gamma rays may be calculated, e.g., with the assistance of a Laser radar imaging (Lidar).

Figure 7:
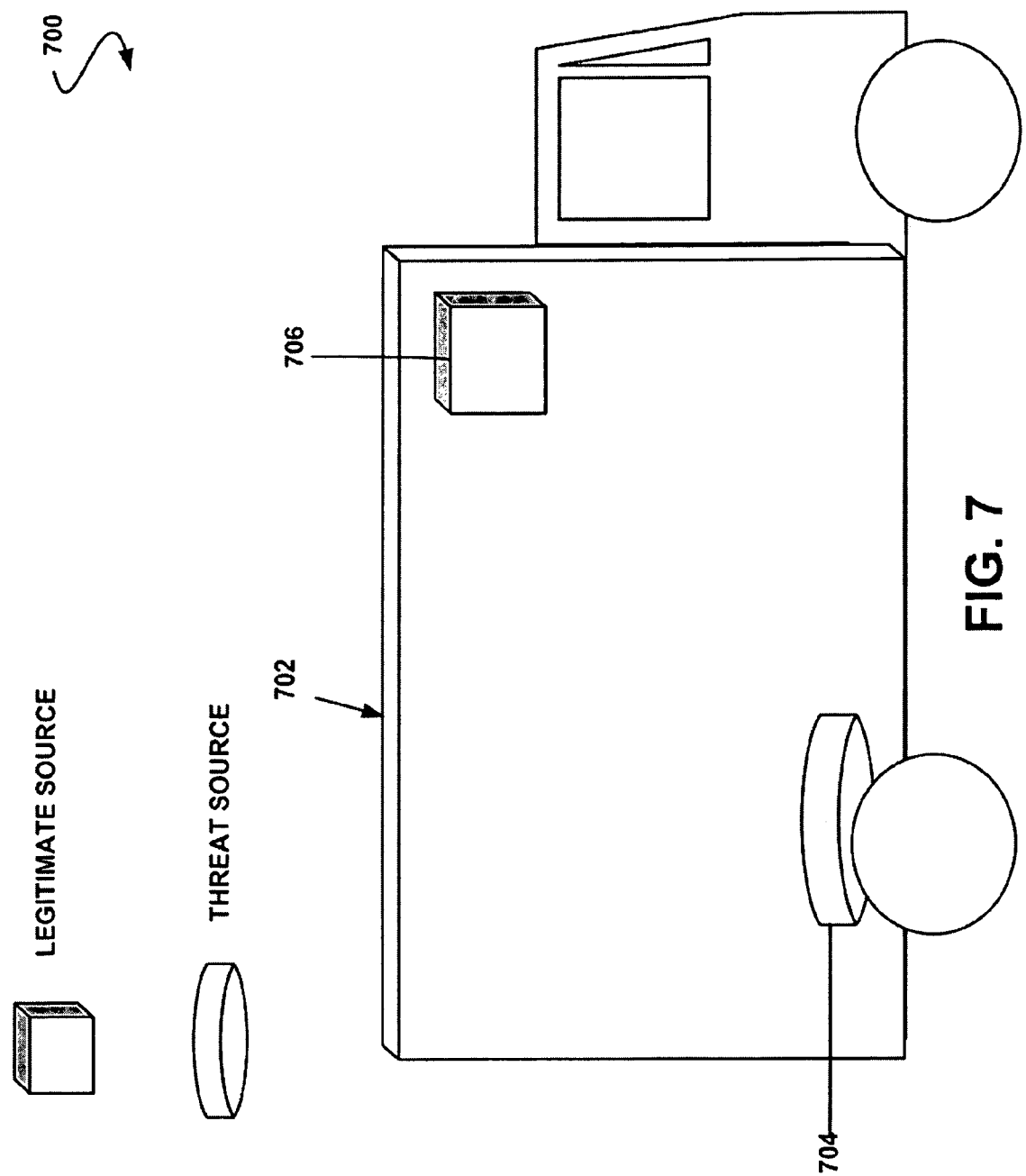
FIG. 7 is a graphical depiction of an illustrative composite image in which a truck is displayed with representations of two sources of gamma rays.

FIG. 7 illustrates an illustrative composite image 700 in which a truck 702 is displayed with representations of two sources 704, 706 of gamma rays. As shown, the representations of the two sources 704, 706 of gamma rays are shown at about their relative location in the truck 702. Analysis indicates that one source 704 is not a threat, but the other source 706 is a threat.

Provisional U.S. application Ser. No. 60/958,967, from which priority is claimed and which has been incorporated by reference, describes several embodiments and methods for combining three dimensional image information with gamma ray imaging. Also shown are composite images illustrating a representation of the source of the gamma rays and a representation of an environment of the source of the gamma rays.

The arrays may be organized in a planar or a cylindrical configuration. In the planar configuration, the imager may have a circular configuration with orthogonal strips on each side connected to a preamplifier and a digital data-acquisition system to determine the three-dimensional (3D) position for each gamma-ray interaction. In the cylindrical configuration, the outside contact is divided into pixels that, when analyzed with a digital signal processor, provide the necessary 3D information.

An illustrative Compton (only) imager which may be adapted to the teachings herein uses four layers of detectors: two silicon crystals and two germanium crystals, together measuring about 8 by 8 by 6 cubic centimeters. The detectors are manufactured at Lawrence Berkeley National Laboratory and the Research Centre Jülich in Germany. With its 3D position capability and combined detector materials, the system can track gamma-ray interactions to a resolution of 0.5 millimeter. Even these detectors can be used in a very simplistic "coded aperture" imaging modality, by observing the shadow cast by a detector onto the other. This can be used for imaging sources that have a simple spatial distribution, e.g. point sources.

A detection system based on tracking gamma rays provides unprecedented sensitivity not only for Compton imaging but also for nuclear spectroscopy, which is used to identify nuclear materials. The Compton imaging functionality can distinguish gamma rays that deposit only partial energy in the detector from those that are fully absorbed so background signals can be more easily eliminated. The illustrative system applies the Compton scattering formula to the positions of the first and second interactions to deduce the angle of the incident gamma ray to within a certain cone-shaped area.

Some embodiments may use high-resolution silicon and germanium detectors, which must remain at low temperatures to operate. Accordingly, in one approach, the detectors may be housed in one or more cryostats cooled by liquid nitrogen. Another approach uses two cryostats—one for the two silicon detectors and one for the two germanium detectors.

A few advantages of various embodiments as compared with present state-of-the-art systems are: increased imaging efficiency for photons in a large range of energies, e.g., from ≦25 keV to several MeVs; option for good spectroscopic characteristics conferred by the use of room-temperature CZT detectors and some scintillators; large field of view; and ability to easily scale tip the system.

Embodiments of the present invention may be used in a wide variety of applications, and potentially any application in which imaging is useful.

Illustrative uses of various embodiments of the present invention include, but are not limited to, applications requiring gamma-ray imaging. Search, surveillance and monitoring of radioactive materials are a few such examples. Another application is mapping of radioactive sources distributed within a large field-of-view in the medium to large-field distances. Various embodiments can also be used in the nuclear fuel cycle, homeland security applications, nuclear non-proliferation, medical imaging, etc.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and high-resolution instruments that emergency response personnel can use to search for a clandestine nuclear device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
an array of radiation detectors arranged along a plane in a patterned configuration defining apertures therebetween; and
an array of imagers positioned behind the array of detectors relative to an expected trajectory of incoming radiation.

2. The system of claim 1, wherein at least some of the detectors are position sensitive detectors.

3. The system of claim 1, wherein at least one of the detectors and imagers are semiconductor detectors.

4. The system of claim 1, wherein the detectors are CdZnTe detectors.

5. The system of claim 1, wherein the detectors are scintillating detectors.

6. The system of claim 1, wherein at least some of the imagers are position sensitive.

7. The system of claim 1, wherein the imagers are also radiation detectors.

8. The system of claim 1, wherein the radiation detectors are arranged in a coded aperture configuration.

9. The system of claim 1, wherein the imagers are CdZnTe detectors.

10. The system of claim 1, wherein the imagers are scintillating detectors.

11. The system of claim 1, further comprising at least a second array of imagers positioned behind the array of detectors and array of imagers relative to an expected trajectory of incoming radiation.

12. The system of claim 1, further comprising a camera for capturing an image of an environment of a source of the radiation.

13. The system of claim 12, further comprising a processor for generating a composite image depicting a representation of the source of the radiation and a representation of an environment of the source of the radiation.

14. The system of claim 1, wherein the radiation includes gamma rays.

15. A system, comprising:
an array of radiation detectors; and
an array of imagers positioned behind the array of detectors relative to an expected trajectory of incoming radiation,
wherein the detectors and imagers are arranged in a mask-antimask configuration.

16. A method, comprising:
detecting incoming radiation with an array of radiation detectors arranged in a patterned configuration defining apertures therebetween;
detecting the incoming radiation that passes through the apertures with an array of imagers positioned behind the array of detectors relative to a trajectory of the incoming radiation; and
performing at least one of Compton imaging using at least the imagers and coded aperture imaging using at least the imagers.

17. The method of claim 16, further comprising determining an approximate trajectory of the radiation.

18. The method of claim 16, further comprising determining an approximate energy of the radiation.

19. The method of claim 16, further comprising determining an approximate location of a source of the radiation.

20. The method of claim 19, further comprising generating a composite image depicting a representation of the source of the radiation and a representation of an environment of the source of the radiation.

21. The method of claim 16, wherein the detectors and imagers are used for performing the Compton imaging.

22. The method of claim 16, wherein at least some of the detectors are position sensitive detectors.

23. The method of claim 16, wherein the radiation detectors are arranged in a coded aperture configuration.

24. The method of claim 16, wherein the detectors are scintillating detectors.

25. The method of claim 16, wherein at least some of the imagers are position sensitive.

26. The method of claim 16, wherein the imagers are radiation detectors.

27. The method of claim 16, wherein at least one of the detectors and the imagers are semiconductor detectors.

28. The method of claim 16, wherein at least one of the detectors and the imagers are CdZnTe detectors.

29. The method of claim 16, wherein the imagers are scintillating detectors.

30. The method of claim 16, further comprising a second array of imagers positioned behind the array of detectors and array of imagers relative to an expected trajectory of incoming radiation.

31. The system of claim 16, wherein the radiation includes gamma rays.

32. A method, comprising
detecting incoming radiation with an array of radiation detectors;
detecting the incoming radiation with an array of imagers positioned behind the array of detectors relative to a trajectory of the incoming radiation; and
performing at least one of Compton imaging using at least the imagers and coded aperture imaging using at least the imagers,
wherein the detectors and imagers are arranged in a mask-antimask configuration.

33. A method, comprising:
detecting incoming radiation with an array of imagers positioned behind an array of detectors relative to a trajectory of the incoming radiation, the array of detectors being arranged in a patterned configuration defining apertures therebetween through which some of the incoming radiation passes; and
performing Compton imaging using at least the imagers.

* * * * *